(12) United States Patent
Yamagiwa (10) Patent No.: US 7,095,721 B2
(45) Date of Patent: Aug. 22, 2006

(54) FILTERING USING COMMUNICATION LINE IDENTIFICATION

(75) Inventor: Hirofumi Yamagiwa, Saitama (JP)

(73) Assignee: Juniper Networks, Inc., Sunnyvale, CA (US)

( * ) Notice: Subject to any disclaimer, the term of this patent is extended or adjusted under 35 U.S.C. 154(b) by 1080 days.

(21) Appl. No.: 09/861,890

(22) Filed: May 22, 2001

(65) Prior Publication Data

US 2002/0001297 A1 Jan. 3, 2002

(30) Foreign Application Priority Data

May 22, 2000 (JP) .............................. 2000-149750

(51) Int. Cl.
*H04B 7/00* (2006.01)
*H04Q 7/00* (2006.01)
*H04L 12/28* (2006.01)

(52) U.S. Cl. ................. 370/310.2; 370/328; 370/395.1
(58) Field of Classification Search ................ 370/338, 370/349, 397, 401
See application file for complete search history.

(56) References Cited

U.S. PATENT DOCUMENTS

| | | | |
|---|---|---|---|
| 5,467,349 A * | 11/1995 | Huey et al. .................. 370/397 |
| 5,768,274 A * | 6/1998 | Murakami et al. ........ 370/395.7 |
| 6,198,726 B1 * | 3/2001 | Hayami et al. ........... 370/236.2 |
| 6,289,014 B1 * | 9/2001 | Hoshino et al. ............ 370/392 |
| 6,594,267 B1 * | 7/2003 | Dempo ................... 370/395.64 |
| 6,667,977 B1 * | 12/2003 | Ono ............................ 370/392 |
| 2005/0122925 A1 * | 6/2005 | Chitre et al. ............. 370/310.1 |

FOREIGN PATENT DOCUMENTS

| | | |
|---|---|---|
| JP | 6-232896 | 8/1994 |
| JP | 10-145374 | 5/1998 |
| WO | WO 97/04569 | 2/1997 |
| WO | WO 99/21313 | 4/1999 |

* cited by examiner

*Primary Examiner*—Steven Nguyen
(74) *Attorney, Agent, or Firm*—Harrity Snyder LLP (57) ABSTRACT

In a method for terminating a plurality of ATM lines for a base station modulator/demodulator in a mobile communication system for data communication between upper stations and a base station by a transmission method wherein ATM cells are mapped utilizing an existing leased line as a physical medium sublayer, when an increase in capacity of the base station necessitates leased line interfaces corresponding to a plurality of upper stations, processing is carried out in such a manner that leased line numbers are added to respective HEC regions of ATM cells sent from each upper station into a leased line interface section, whereby the addition of the function of the leased line interface section involved in an increase in the leased line can be minimized and the additional function can be simply designed utilizing a conventional technique. By virtue of this constitution, a method for receiving a plurality of ATM lines can be realized which can efficiently utilize VCI filters and can distinguish each upper station in a leased line interface section.

17 Claims, 11 Drawing Sheets

HEC (HEADER ERROR CONTROL)

FIG. 16

FILTERING USING COMMUNICATION LINE IDENTIFICATION

FIELD OF THE INVENTION

The invention relates to a mobile communication system, a base station demodulator for the mobile communication system, and a method for terminating a plurality of ATM lines in the base station demodulator.

BACKGROUND OF THE INVENTION

Figure 1:
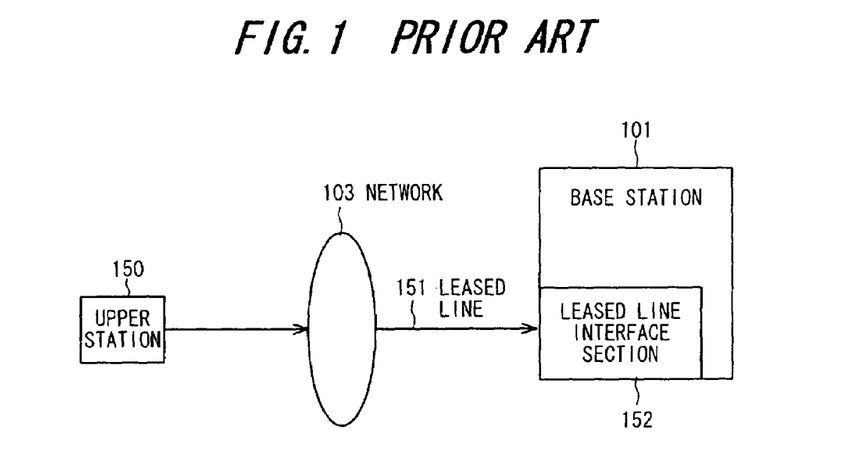
FIG. 1 is a system construction diagram showing an example of a conventional mobile communication system for data communication between an upper station and a base station by a transmission method wherein ATM cells are mapped utilizing an existing leased line.

FIG. 1 is a system construction diagram showing one example of a conventional mobile communication system for data communications between an upper station and a base station by a transmission method wherein ATM calls are mapped utilizing an existing leased line.

An upper station 150 is connected to a base station 101 through a network 103 and a leased line 151, and is connected to a leased line interface 152 within the base station 101. Therefore, the upper station 150 and the leased line interface 152 are connected in a 1:1 logical relationship.

Figure 2:
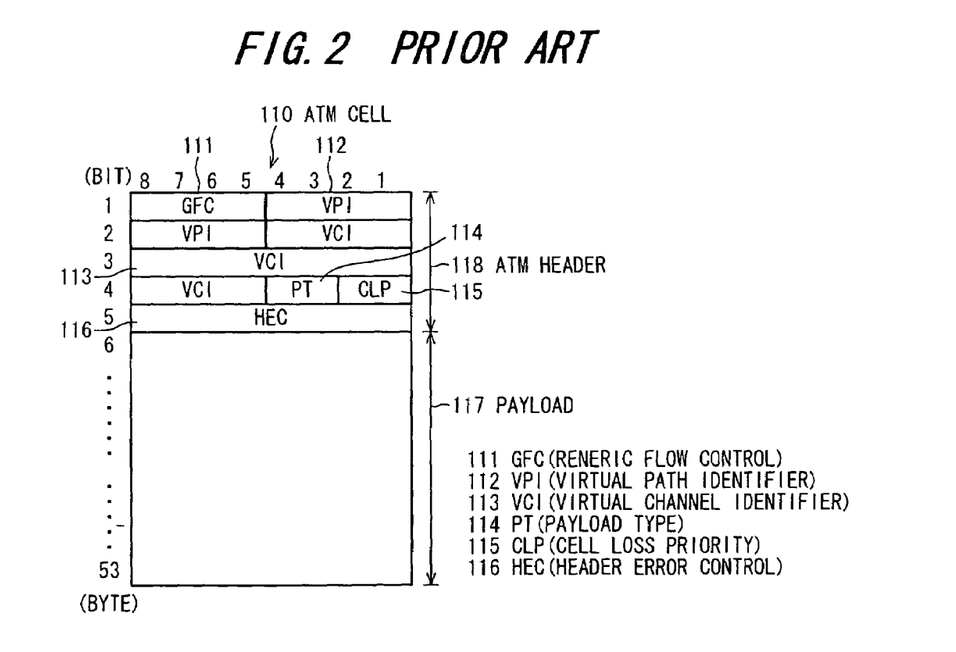
FIG. 2 is a typical diagram showing an ATM cell format.

FIG. 2 is a typical diagram showing an ATM cell format. An ATM cell 110 is constituted by data of 53 bytes, and is divided into an ATM header 118 in a region of 5 bytes from the head and a payload 117 of the remaining 48 bytes. The ATM header 118 is composed of GFC (generic flow control) 111, VPI (a virtual path identifier) 112, VCI (a virtual channel identifier) 113, PT (a pay load type) 114, CLP (cell loss priority) 115, and HEC (header error control) 116.

VPI 112 is utilized for setting a virtual path between the upper station and the base station. VCI 113 is utilized for identification in the case of the communication of a plurality of data through the set VP (a virtual path).

HEC 116 detects a bit error in the ATM header 118, and is the result of 8-bit CRC coding for 4 bytes of the portion other than HEC 116 in the ATM header 118. The payload 117 is a communication data storage region.

Figure 3:
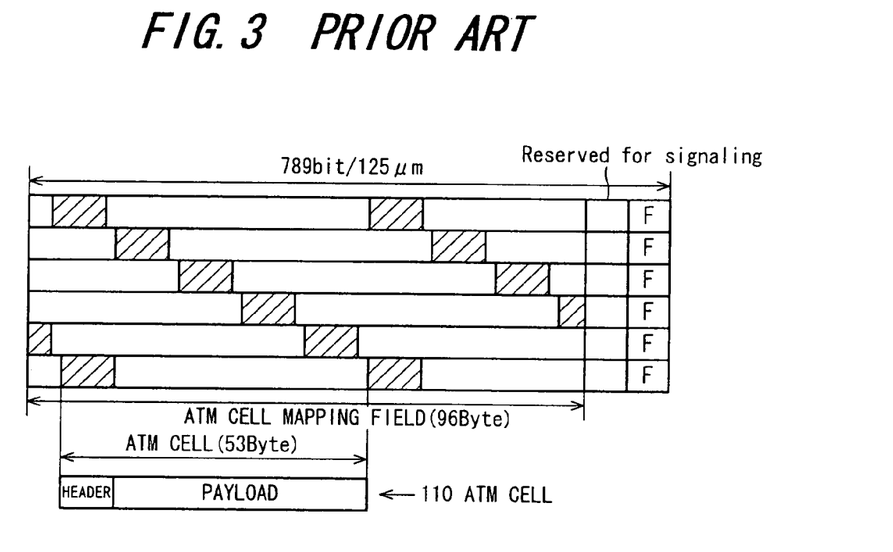
FIG. 3 is a typical diagram showing a leased line (secondary group) frame format which is one embodiment of a leased line frame format.

FIG. 3 is a typical diagram showing a leased line (secondary group) frame format which is an example of a leased line frame format.

Figure 4:
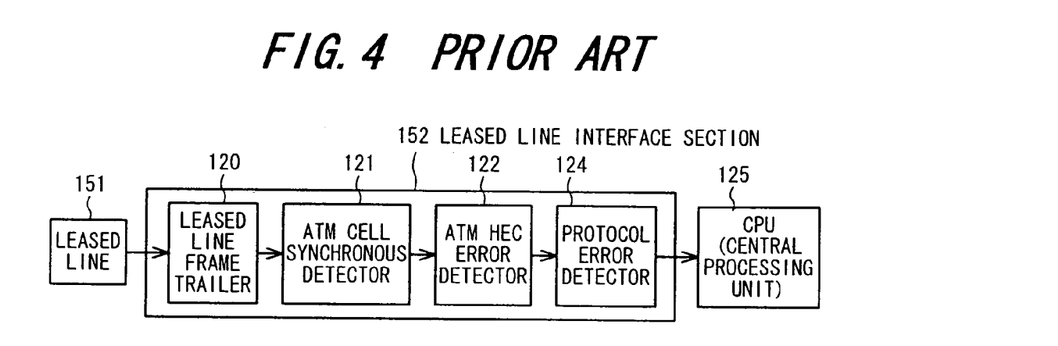
FIG. 4 is a typical diagram showing the construction of ATM cell termination processing means in a leased line interface section 152 according to an example of the prior art technique.

FIG. 4 is a typical diagram showing the construction of ATM cell termination processing means in the leased line interface 152 in the prior art technique. Data received from the leased line 151 is synchronized in a frame format as shown in FIG. 3 at a leased line frame trailer 120 in the leased line interface 152. After the establishment of the frame synchronization, cell synchronization for establishing the cell boundary position is carried out in an ATM cell synchronization detector 121 to identify the ATM cell 110 which has bean mapped within the frame.

Figure 5:
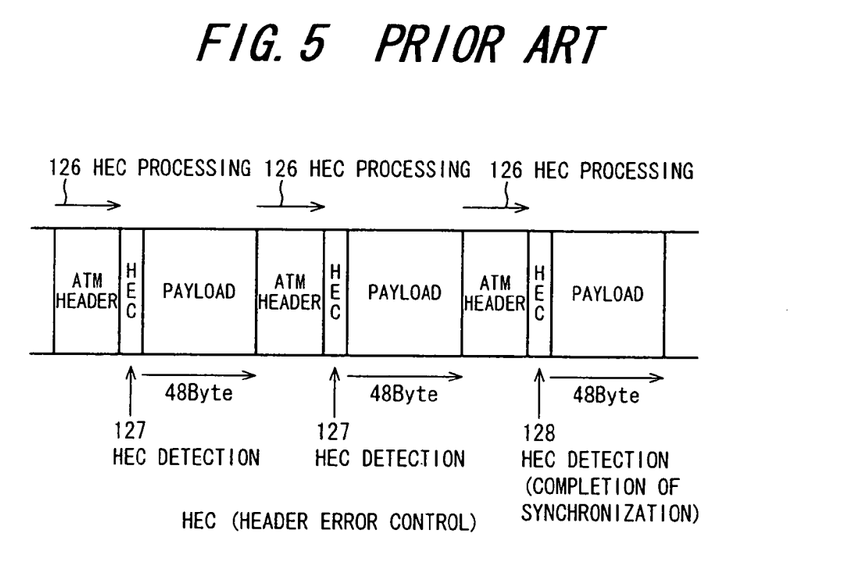
FIG. 5 is a typical diagram illustrating a method for ATM cell synchronization in an ATM cell synchronization detector 121 shown in FIG. 4.

FIG. 5 is a typical diagram illustrating an ATM cell synchronization method in the ATM cell synchronization detector 121 shown in FIG. 4. The ATM cell 110 is fixed in 53 bytes and mapped within the frame. Therefore, from the state wherein cell synchronization has not been established, the ATM cell synchronization detector 121 performs HEC processing 126 of the received signal one bit by one bit, and recognizes a position, at which data free from an HEC error has been detected, as an ATM header 118. Since the ATM header 118 is continuously received in a cycle of 53 bytes, the processing is continued based on the assumption that the next ATM header 118 is present at a position located 48 bytes after HEC-detected position. Stable HEC detection is the point of cell synchronization completion 128.

Upon the cell synchronization completion 128, the ATM cell synchronization detector 121 can extract ATM cells within the frame.

The ATM HEC error detector 122 shown in FIG. 4 performs error detection of HEC 116 in the restored ATM cell 110, and an ATM cell 110, in which an error has been found, is discarded in this functional section because there is a possibility that the error has taken place during data transmission.

In the protocol error detector 124 shown in FIG. 4, upon the receipt of an ATM cell 110 free from the HEC error, confirmation is made on whether or not VPI/VCI is an expected value. When data communication takes place between the upper station 150 and the base station 101, VPI/VCI is set and functions as a parameter at the time of communication with the upper station 150. Therefore, upon the receipt of an ATM cell having an value other than the set value, this ATM cell should be discarded as a protocol error.

Figure 6:
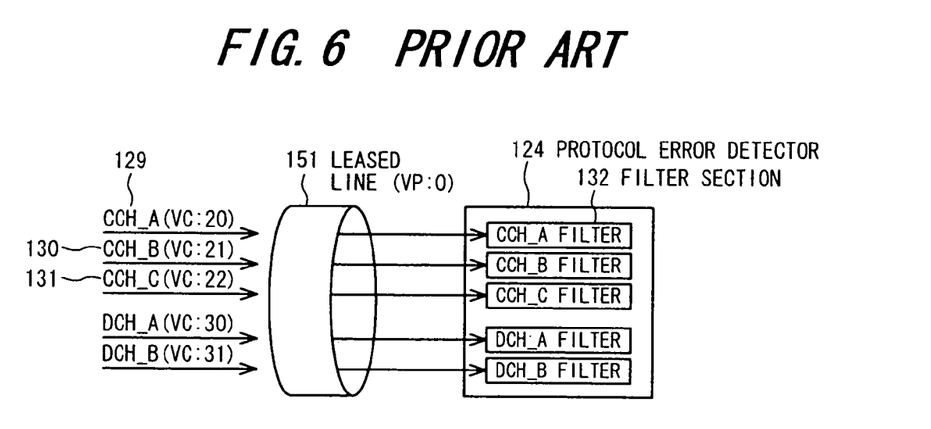
FIG. 6 is a typical diagram showing the construction of CCH connection according to an example of the prior art technique.

FIG. 6 is a typical diagram showing an example of the construction of CCH connection in the prior art technique. In the example shown in FIG. 6, CCH (control channel) is a signal provided for the control of the base station 101, and three CCH signals are provided per base station 101. The upper station uses the CCH signal to control the base station, for example, at the time of connection to a terminal.

In CCH_A 129, VCI 113 is set at "20." CCH_B 130 has a VCI 113 value of "21," and CCH_C 131 a VCI 113 value of "22." Further, DCHs (data channels) also have respective different VCIs 113. All the signals including DCHs have identical VPI 112 "0." DCHs represent voice data, and are respectively identified by VC.

Since the type of CCH/DCH is identified by VCI 113, the base station 101 should provide the same number of VCI filters 132 as the number of VCIs connected by the leased line 151 to detect an protocol error.

In the VCI filter 132, VPI/VCI does not have a fixed value. Therefore, the value is set at the time of connection to the upper station 150, and comparison is performed for the set value.

Figure 7:
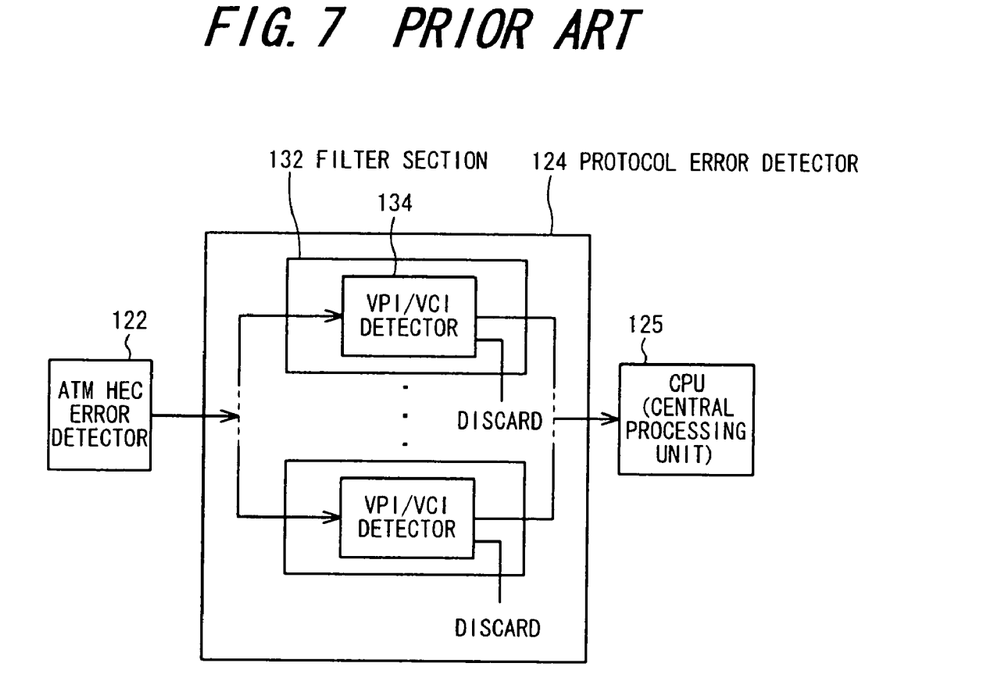
FIG. 7 is a typical diagram showing the construction of a protocol error detector 124 shown in FIG. 4.

FIG. 7 is a typical construction diagram of the protocol error detector 124 shown in FIG. 4. For the ATM cell 110 sent from the ATM HEC error detector 122, VPI/VCI is confirmed by the VPI/VCI detector 134. ATM Cells 110 other than the set VPI/VCI are discarded. CPU 125 receives ATM cells 110, which have not been discarded in the protocol error detector 124, and detects data in the payload 117.

This prior art technique, however has the following problems.

Figure 8:
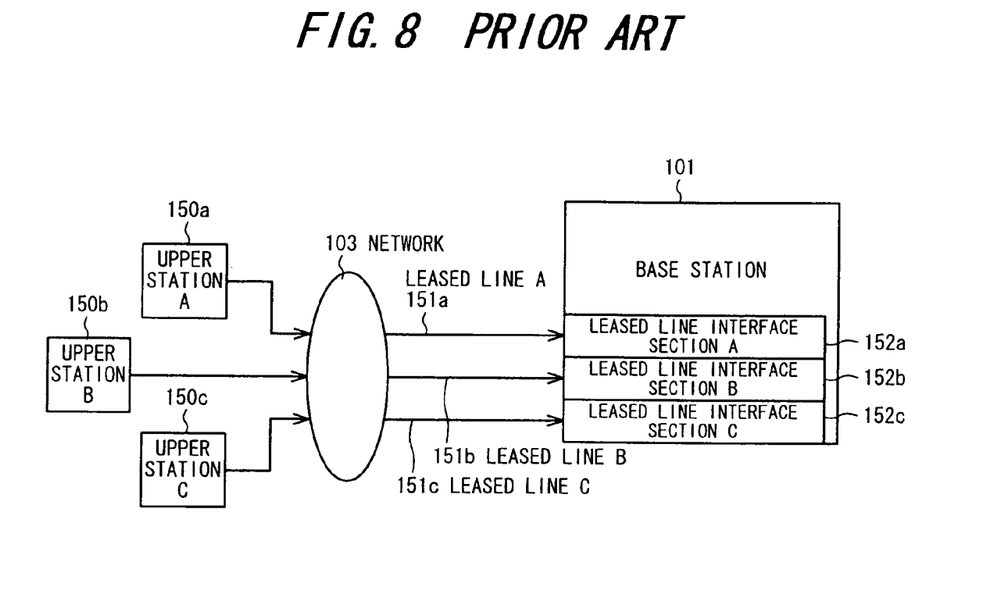
FIG. 8 is a typical system construction diagram illustrating the connection of a plurality of upper stations to a base station in a mobile communication system, according to an example of the prior art technique, for data communication between upper stations and a base station by a transmission method wherein ATM cells are mapped using an existing leased line.

The first problem is that, when a plurality of connections to upper stations 150 have become necessary due to an increase in capacity of the base station 101, the base station 101 should provide the same number of leased line interfaces 152 as the number of upper stations (connected leased lines). FIG. 8 is a typical system construction diagram at the time of the connection of a plurality of upper stations to the base station in a conventional mobile communication system for data communication between upper stations and a base station by a transmission method wherein ATM cells are mapped using an existing leased line.

In signals provided between the upper stations 150 and the base stations 101, like CCH, the number of supports in the base station 101 is fixed. For example, the base station is controlled by an upper station A. On the other hand, data comes from upper station A/upper station B/upper station C. Therefore, the number of CCHs in the base station is limited. In this signal, the upper station connected by the leased line 151, from which the connection of VCI is carried out, is not determined. This is because a redundancy is considered such that, for example, when the upper station A 150a has had trouble, the upper station B 150b as an alternative station connects CCH to prevent breakdown of the system.

Figure 9:
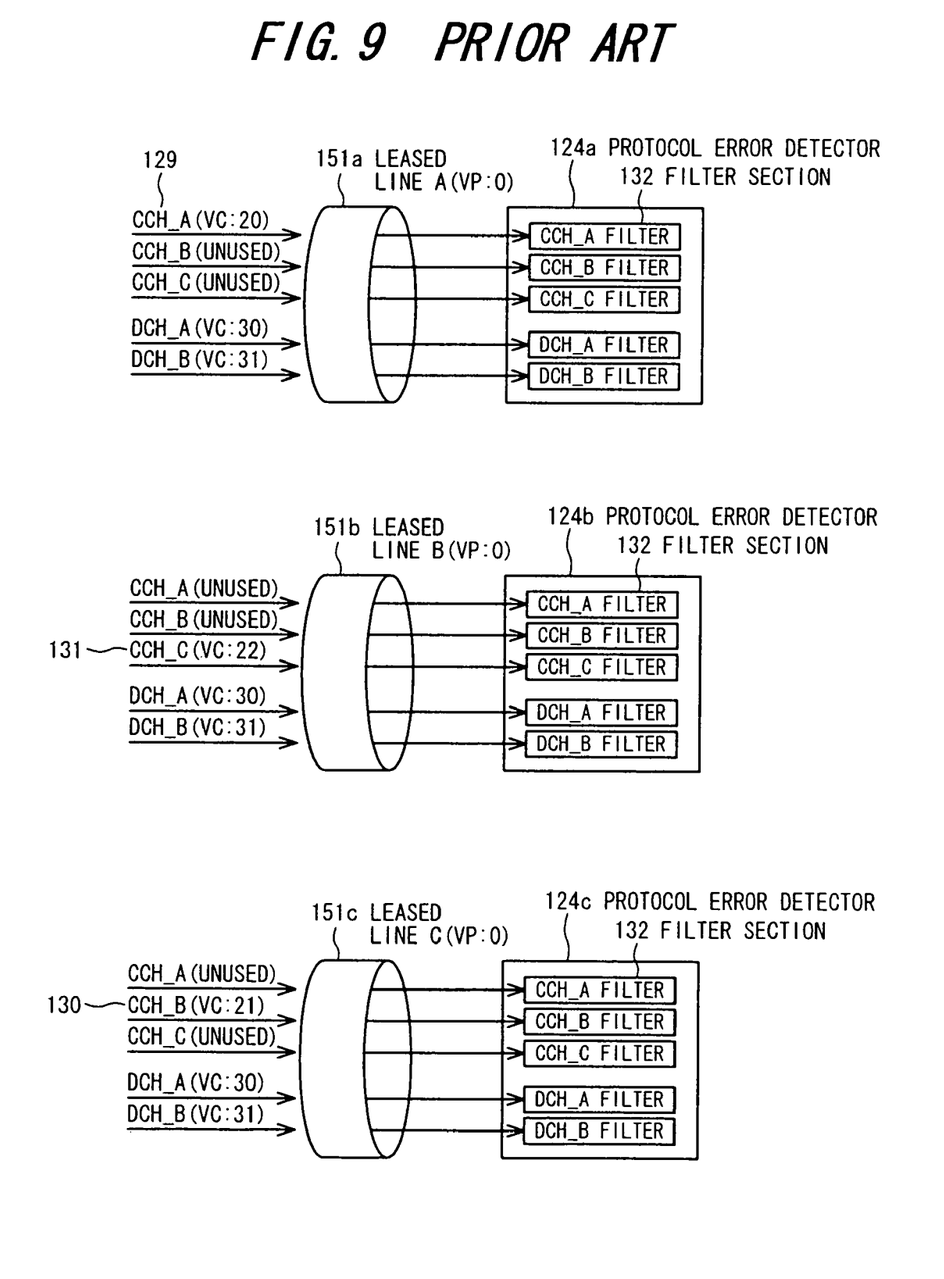
FIG. 9 is a typical diagram showing the construction of CCH connection of a plurality of upper stations according to an example of the prior art technique.

FIG. 9 is a typical diagram showing the construction of CCH connection through a plurality of upper stations in the prior art technique. In the conventional protocol error detector 124, filters of VPI/VCI set as shown in FIG. 6 should be provided. Therefore, as shown in FIG. 8, a leased line interface section A 152a, a leased line interface section B 152b, and a leased line interface section C 152c should be provided for respective leased lines.

As shown in FIG. 9, when CCH is connected from each upper station 1 VCI by 1 VCI, however, the VIC filter 132 of CCH not supported by the protocol error detector 124 of the leased line interface sections 152a/152b/152c is not used.

Thus, in the conventional construction, a larger number of VIC filters 132 than necessary should be provided in the protocol error detector 124. This is disadvantageous from the viewpoints of a reduction in size of hardware and a reduction in cost.

The second problem is that, with respect to VPI/VCI set between upper stations, a value falling within a specified range can be independently set for each upper station and, thus, an identical value can be used in each upper station. In FIG. 9, CCH_A 129, CCH_B 130, and CCH_C 131 are different from each other in VCI 113. In fact, however, in all the upper stations, the VCI 113 can be set at "20."

Thus, since identical VPI/VCI can be used in each upper station, the leased line interface sections 152a/152b/152c cannot identify the upper stations through VPI/VCI.

SUMMARY OF THE INVENTION

Accordingly, it is an object of the invention to solve the above problems of the prior art and to provide a method for receiving a plurality of ATM lines, which can efficiently utilize VIC filters and can identify each upper station in a leased line interface section.

According to the first feature of the invention, there is provided a mobile communication system for data communication between upper stations and a base station by a transmission method wherein ATM cells are mapped using a physical medium sublayer, said mobile communication system comprising a plurality of upper stations, a base station, and a physical medium sublayer comprising a plurality of leased line interfaces for connecting the respective upper stations to the base station, wherein the base station has a demodulator comprising: means for adding a leased line number to an ATM cell in its HEC region input into a leased line interface section from each upper station; and means for detecting and processing the added leased line number.

The physical medium sublayer having a plurality of leased line interfaces may be an existing leased line, and transmission may be carried out in such a state that ATM cells are mapped in a leased line frame format. Alternatively, the physical medium sublayer having a plurality of leased line interfaces may be of a synchronous digital hierarchy (SDH) system, and transmission may be carried out in such a state that ATM cells ate mapped in a leased line frame format.

According to a second feature of the invention, there is provided a base station demodulator in a mobile communication system for data communication between upper stations and a base station by a transmission method wherein ATM cells are mapped using a physical medium sublayer, said base station demodulator comprising: means for adding a leased line number to the ATM cell in its HEC region sent to a leased line interface section in the base station demodulator from each upper station; and means for detecting and processing the added leased line number.

The leased line interface section preferably comprises: a plurality of sets of a leased line frame trailer, an ATM cell synchronization detector, an ATM HEC error detector, and an HEC corrector, the sets corresponding respectively to a plurality of leased lines; and one protocol error detector, wherein:

in the leased line frame trailers, synchronization of the frame format of data received from the leased line is carried out;

in the ATM cell synchronization detector, cell synchronization for establishing the boundary position of the cell is carried out for identifying an ATM cell mapped within the frame after the establishment of frame synchronization;

in the ATM HEC error detector, HEC error detection is carried out in the ATM cell which has become detectable by the cell synchronization;

in the HEC corrector, the content of HEC within the ATM header is rewritten to the number of the leased line;

the protocol error detector has a plurality of filters comprising a leased line number detector and a VPI/VCI detector;

the leased line number detector confirms the leased line number of HEC of the input ATM cell and, when the leased line number has been found to be matched, sends the ATM cell to the VPI/VCI detector; and the VPI/VCI detector confirms VPI/VCI of the ATM header and, when the VPI/VCI has been found to be matched, sends the ATM cell to CPU.

According to a third feature of the invention, there is provided a method for terminating a plurality of ATM lines of a base station demodulator in a mobile communication system for data communication between upper stations and a base station by a transmission method wherein ATM cells are mapped using a physical medium sublayer, wherein:

data received from a plurality of leased lines are subjected to the synchronization of the frame format in respective leased line frame trailers;

in an ATM cell synchronization detector, cell synchronization for establishing the boundary position of the cell is carried out for identifying an ATM cell mapped within the frame;

in an ATM HEC error detector, HEC error detection is carried out in the ATM cell which has become detectable by the cell synchronization;

in an HEC corrector, the content of HEC within the ATM header is rewritten to the number of the leased line, and ATM cells are sent from the respective HEC correctors to one protocol error detector;

leased line number detectors respectively in a plurality of filters in the protocol error detector confirm the leased line number of HEC of the input ATM cell and, when the leased line number has been found to be matched, send the ATM cell to a VPI/VCI detector; and the VPI/VCI detector confirms VPI/VCI of the ATM header and, when VPI/VCI has been found to be matched, sends the ATM cell to CPU.

BRIEF DESCRIPTION OF THE DRAWINGS

The invention will be explained in more detail in conjunction with the appended drawings, wherein.

DESCRIPTION OF THE PREFERRED EMBODIMENTS

According to the invention, in a method for terminating a plurality of ATM lines for a base station demodulator (hereinafter referred to as "base station" in a mobile communication system for data communication between upper stations and a base station by a transmission method wherein ATM cells are mapped utilizing an existing leased line as a physical medium (PM) sublayer, when an increase in capacity of the base station necessitates a plurality of upper station (leased line) interfaces, processing is carried out in such a manner that leased line numbers are added to respective HEC regions of ATM cells sent from each upper station into a leased line interface section, whereby the addition of the function of the leased line interface section involved in an increase in the leased line can be minimized and the additional function is simply designed utilizing a conventional technique.

Figure 10:
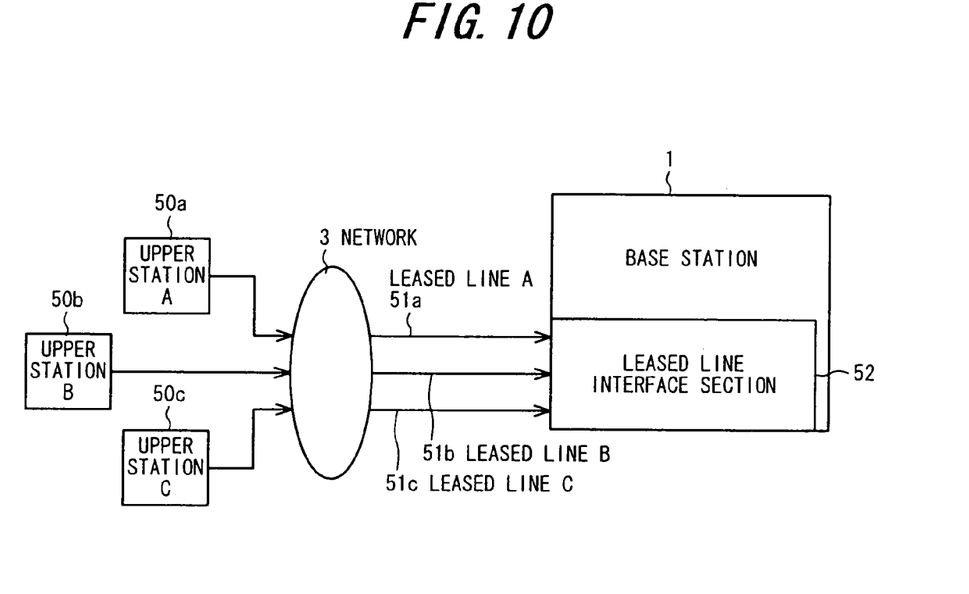
FIG. 10 is a typical system construction diagram illustrating the connection of a plurality of upper stations to a base station in a mobile communication system, according to a preferred embodiment of the invention, for data communication between the upper stations and the base station by a transmission method wherein ATM cells are mapped using an existing leased line.
Figure 11:
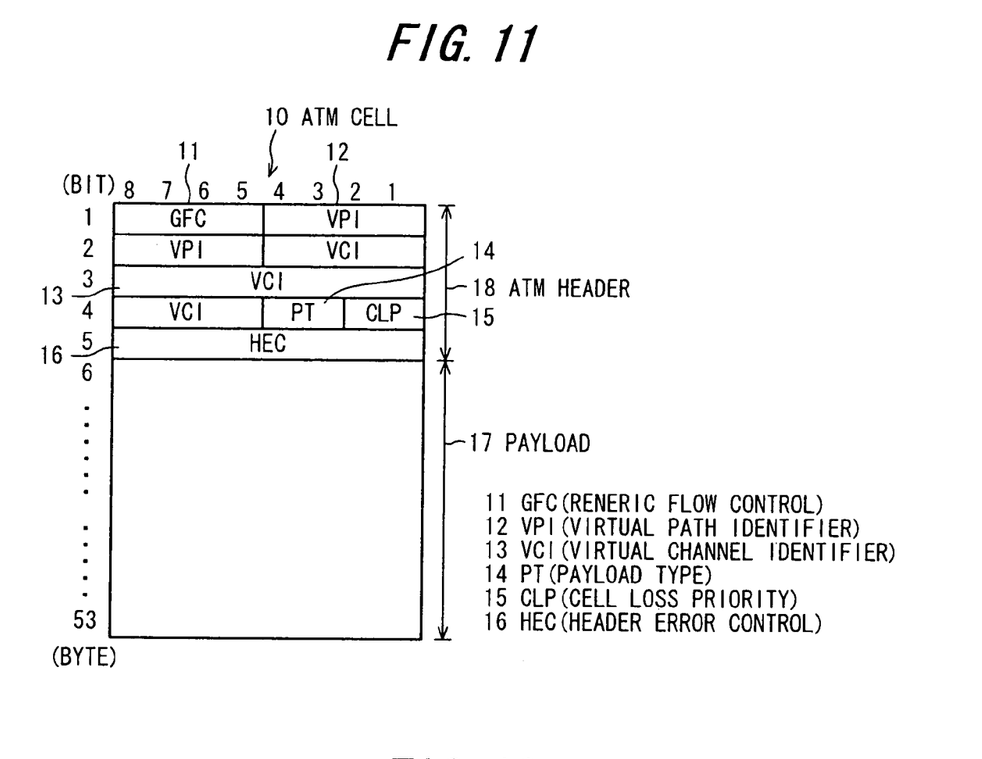
FIG. 11 is a typical diagram showing an ATM cell format.

Next, preferred embodiments of the invention will be explained in conjunction with the accompanying drawings. FIG. 10 is a typical system construction diagram illustrating the connection of a plurality of upper stations to a base station in a mobile communication system, according to a preferred embodiment of the invention, for data communication between the upper stations to the base station by a transmission method wherein ATM cells are mapped using an existing leased line. FIG. 11 is a typical diagram showing an ATM cell format.

In data communication between a base station 1 and an upper station 50 in a mobile communication system, a transmission method is used wherein an existing leased line is utilized as a physical medium sublayer and ATM cells 10 are mapped in a leased line frame format.

An upper station A 50a, an upper station B 50b, and an upper station C 50c are respectively connected to a leased line interface section 52 in a base station 1 through a network 3 and a leased line A 51a, a leased line B 51b, and a leased line C 51c. The upper stations and the leased line interface section 52 are connected in a 1:3 logical relationship.

An ATM cell 10 is constituted by data of 53 bytes, and is divided into an ATM header 18 in a region of 5 bytes from the head and a payload 17 of the remaining 48 bytes. The ATM header 18 is composed of GFC (generic flow control) 11, VPI (a virtual path identifier) 12, VCI (a virtual channel identifier) 13, PT (a pay load type) 14, CLP (cell loss priority) 15, and HEC (header error control) 16.

GFC (generic flow control) 11 is provided to perform flow control when overload takes place over the network due to an increase in traffic.

VPI (virtual path identifier) 12 is utilized for setting a virtual path between the upper station and the base station. VCI (virtual channel identifier) 13 is utilized for identification of a plurality of data in the case of the communication of a plurality of data through the set VP (a virtual path)

PT (payload type) 14 represents the state of cell (congestion), and CLP (cell loss priority) 15 represents the significance of cell.

HEC (header error control) 16 detects a bit error in the ATM header 18, and is the result of 8-bit CRC coding for 4 bytes of the portion other than HEC 16 in the ATM header 18. The payload 17 is a communication data storage region.

Figure 12:
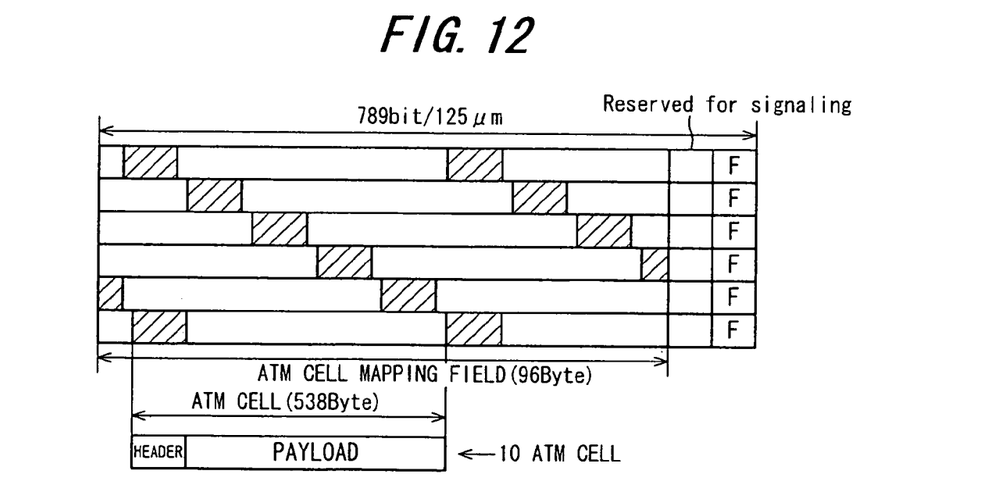
FIG. 12 is a typical diagram showing a leased line (secondary group) frame format which is one embodiment of a leased line frame format.

FIG. 12 is a typical diagram showing a leased line (secondary group) frame format which is one embodiment of a leased line frame format. The secondary group of leased lines have a transmission capacity of 6.3 Mbps wherein 789 bits have been arranged in a frame with a time length of 125 µs. In this format, 98 TSs (time slots) of 8 bits length are possible. ATM cells 10 are continuously arranged in a portion of 96 TSs (96 bytes×8=768 bits) out of 98 TSs.

Figure 13:
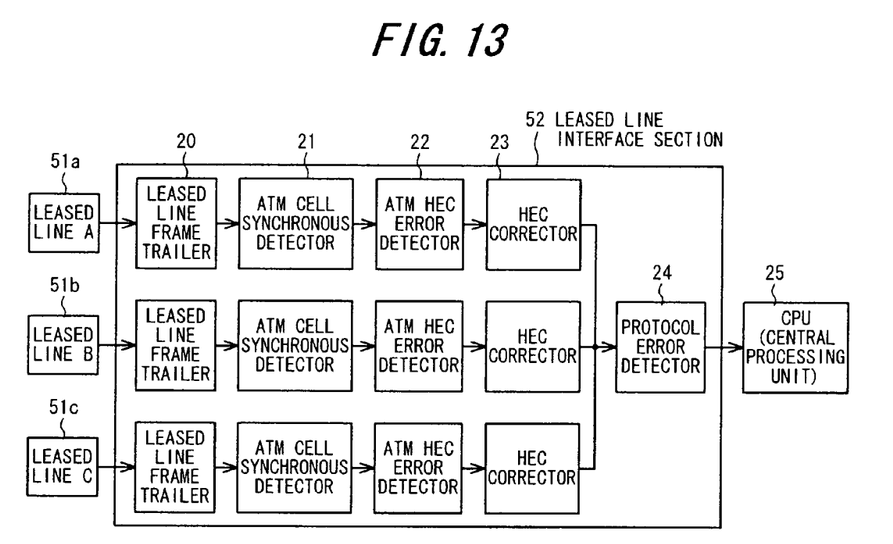
FIG. 13 is a typical diagram showing the construction of ATM cell termination processing means in a leased line interface section of a base station according to the invention.

FIG. 13 is a typical diagram showing the construction of ATM cell termination processing means in a leased line interface section of a base station according to the invention. In the preferred embodiment of the system construction shown in FIG. 10, 3 lines are physically provided as the leased line 51 connected to the base station 1. Therefore, also in the leased line interface section 52, the lines are each independently terminated.

Data received from the leased line 51 is subjected to synchronization of the frame format shown in FIG. 12 in a leased line frame trailer 20. After the establishment of frame synchronization, cell synchronization for establishing the position of cell boundary is carried out to distinguish ATM cells 10 mapped within the frame in an ATM cell synchronization detector 21.

In an ATM HEC error detector 22, error detection of HEC 16 is carried out in the ATM cell 10 which has become detectable by the cell synchronization. An HEC corrector 23 has the function of rewriting the contents of HEC 16 within the ATM header 18 to a leased line number to add leased line numbers to respective ATM cells 10 to be handed to a protocol error detector 24.

Figure 14:
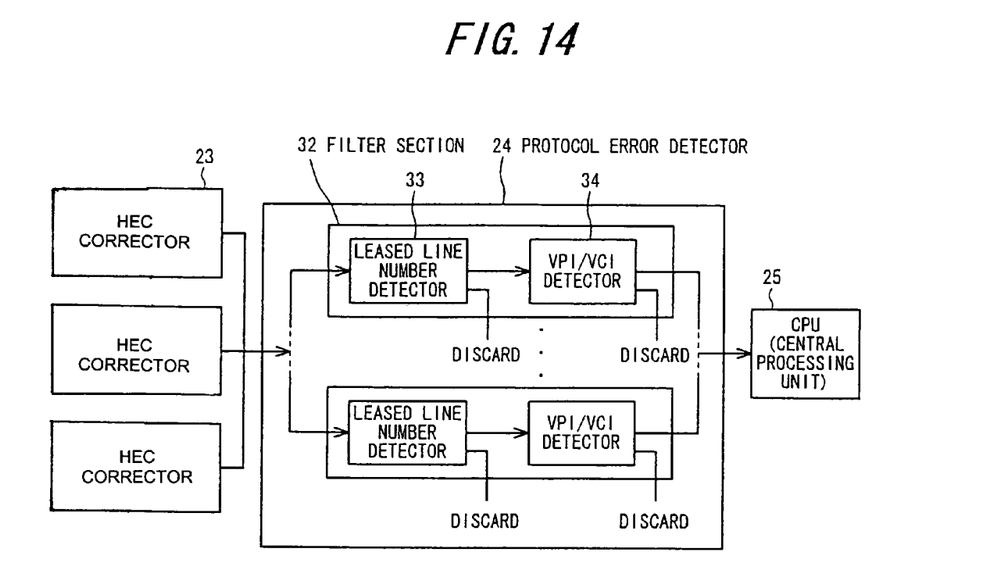
FIG. 14 is a typical diagram showing the construction of a protocol error detector 24 shown in FIG. 13.

FIG. 14 is a typical diagram showing the construction of the protocol error detector 24 shown in FIG. 13. The protocol error detector 24 comprises a plurality of filters 32. Each filter comprise: a leased line number detector 33 for detecting the leased line number described in the received ATM cell 10 in its HEC 16; and a VPI/VCI detector 34 for confirming the set VPI/VCI.

In FIG. 13, CPU 25 receives ATM cells 10, which have not been discarded in the protocol error detector 24, and detects data from the payload 17.

Next, the operation of the preferred embodiments of the invention will be explained.

In FIG. 10, the upper station A 50a is connected through the network 3 and the leased line A 51a to the base station 1. Data received from the leased line A 51a are subjected to synchronization of the frame format shown in FIG. 12 in the leased line frame trailer 20 shown in FIG. 13. The secondary group of leased lines have a transmission capacity of 6.3 Mbps wherein 789 bits have been arranged in a frame with a time length of 125 µs. In this format, 98 TSs (time slots) of 8 bits length are possible. ATM cells 10 are continuously arranged in a portion of 96 TSs (96 bytes×8=768 bits) out of 98 TSs. Since the length of the ATM cell 10 is 424 bits (53 bytes), as shown in the drawing, in some cases, the boundary of the 125 µs frame does not conform to the cell boundary and one ATM cell extends over two frames. The present specifications are in conformity with ITU-T G. 804.

After the establishment of the frame synchronization, cell synchronization for establishing the cell boundary position is carried out in an ATM cell synchronization detector 21 shown in FIG. 13 to identify the ATM cell 10 which has been mapped within the frame format.

Figure 15:
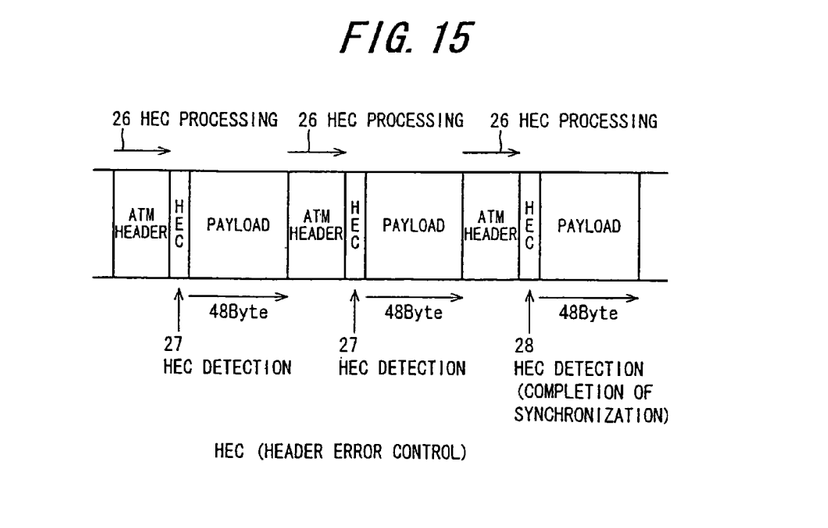
FIG. 15 is a typical diagram illustrating a method for ATM cell synchronization in an ATM cell synchronization detector 21.

FIG. 15 is a typical diagram illustrating a method for ATM cell synchronization in an ATM cell synchronization detector 21. In fact, the leased line is of serial communication type. In this drawing, however, the leased line is shown in 8-bit parallel.

The ATM cell synchronization detector 21 performs HEC processing 26 of received signals from the state of nonestablishment of cell synchronization while shifting the position of the initiation of the computation for each bit. When HEC error has not taken place in the HEC processing 26, this position is regarded as HEC detection 27, followed by through by 48 bytes as the payload 17.

Since the ATM cells 10 are mapped in a fixed length of 53 bytes within the frame format, the ATM headers 18 are continuously detected in a cycle of 53 bytes. The processing is continued based on the assumption that the next ATM header 18 is present at a position located 48 bytes after HEC-detected position 27. Stable HEC detection is regarded as the point of cell synchronization completion 28. Upon the cell synchronization completion 28, the ATM cell synchronization detector 21 can extract ATM cells 10 within the frame format.

The ATM HEC error detector 22 performs error detection of HEC 16 in the extracted ATM cell 10, and an ATM cell 10, in which an error has been found, is discarded in this functional section.

The HEC corrector 23 overwrites a number "A" of the leased line A 51a, which is supported by the HEC corrector 23, in HEC 16 which has been detected to be normal by the ATM HEC error detector 22.

As shown in FIG. 11. VPI is constituted by 8 bits, and VCI is constituted by 16 bits. Therefore, 0 to 255 VPIs can be set for each leased line, and 0 to 65535 VCIs can be set for each VPI. Since values set in relation with the upper stations 50 are each independently managed, there is a possibility that all values are identical.

Identification numbers are added by this processing to ATM cells 10 received from the respective upper stations, and this makes it possible to distinguish, in the leased line interface section 52, signals received from the upper stations.

Figure 16:
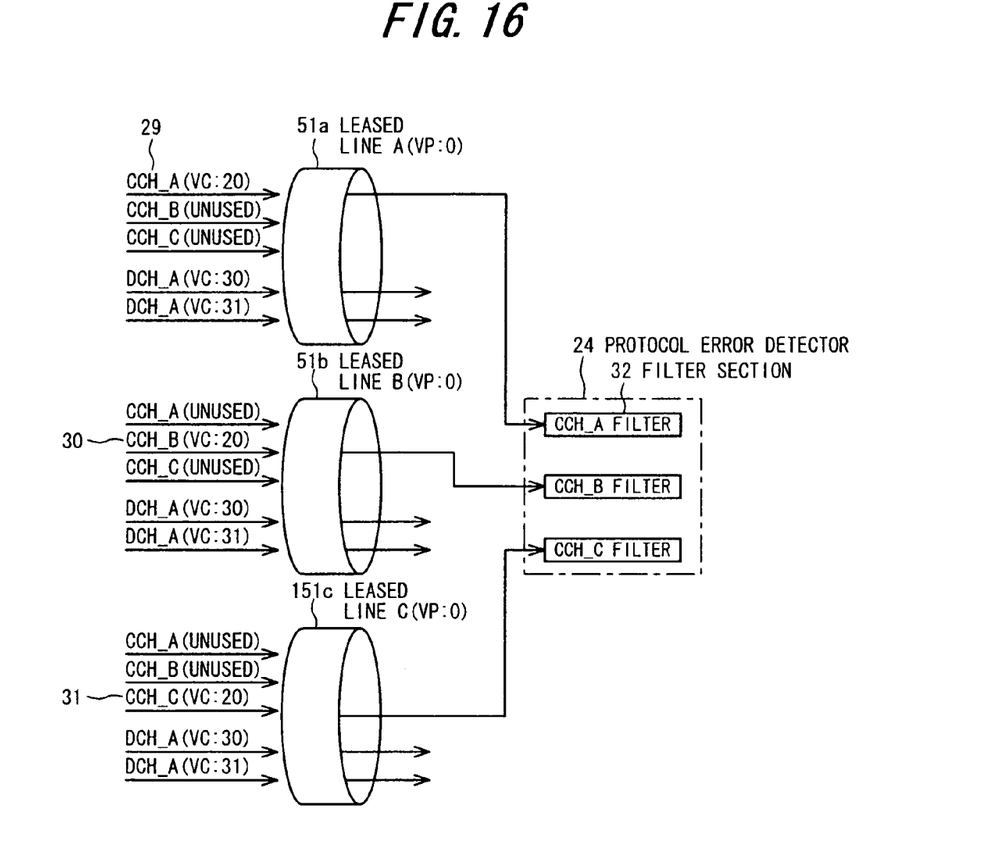
FIG. 16 is a typical diagram showing the construction of CCH connection of a plurality of upper stations according to the invention.

FIG. 16 is a typical diagram showing the construction of CCH connection of a plurality of upper stations according to the invention, and the operation thereof will be explained in detail with reference to the construction diagram of the protocol error detector according to the invention shown in FIG. 14.

The base station 1 is connected to the upper station A 50a, the upper station B 50b, and the upper station C 50c respectively through three leased lines, that is, the leased line A 51a, the leased line B 51b, and the leased line C 51c.

The number of signals connected between each of the upper stations 50 and the base station 1 is two, that is, CCH (control channel) and DCH (data channel). CCH represents a signal for the control of the base station 1. CCH is a control signal and, thus, unlike DCH, should be always connected to the upper station. The necessary number of CCH is fixed as the base station 1.

In FIG. 16, there are three CCHs supported by the base station 1. Specifically, a signal connected to the upper station A 50a is CCH_A 29, a signal connected to the upper station B 50b is CCH_B 30, and a signal connected to the upper station C 50c is CCH_C 31. All the CCHs are constituted by "VPI=0/VCI=20."

As shown in FIG. 14, each filter in the filter section 32 comprises the leased line number detector 33 and the VPI/VCI detector 34, and the value to be filtered can be varied by setting each parameter.

The send/receive of data (ATM cells) between the three HEC correctors 23 and the protocol error detector 24 is carried out on a time division basis. For the input ATM cells 10, the leased line number of HEC 16 is examined in the leased line number detector 33, and, when the leased line number has been found to be unmatched, the ATM cell 10 is discarded, while when the leased line number has been found to be matched, the ATM cell 10 is sent to the VPI/VCI detector 34. In the VPI/VCI detector 34, the ATM header 18 in its VPI/VCI is examined, and, when VPI/VCI has been found to be unmatched, the ATM cell 10 is discarded, while when VPI/VCI has been found to be matched, the ATM cell 10 is sent to CPU 25.

In FIG. 16, in the base station 1, the upper station CCHs should be connected. For this reason, parameters of the CCHs are set in the filter section 32 in the protocol error detector 24.

For example, for CCH_A, "A" is set as a leased line number, and "0/20" is set as VPI/VCI.

In the base station 1, since three CCHs are set, three filters (CCH_A filter/CCH_B filter/CCH_C filter) are necessary in the CCH filter section 32, and, in FIG. 16, one filter is connected to each leased line.

Here when all the three CCHs are assigned to the upper station A 50a, since in the leased line A 51a shown in FIG. 16, VPI is fixed to "0," VCI becomes "20/21/22." Thus, in this case, the receipt is performed in CCH_B and CCH_C which are currently in unuse. In this case, three CCH filters different from each other in parameter provided in the filter section 32 in the protocol error detector 24 can cope with this.

As described above, the addition of leased line termination numbers to ATM cells 10 received respectively from the upper stations permits the necessary number of filters in the filter section 32 to become the number of VCIs supported by the base station 1, and, thus, data communication can be realized by simply providing the necessary minimum functions.

The ATM cell 10, which has been judged to be effective in the protocol error detector 24, is sent to CPU 25 in FIG. 13. CPU 25 identifies an upper station as a sender based on the leased line number indicated in HEC 16 of the ATM cell 10. This can realize sharing of interface with the protocol error detector 24.

This preferred embodiment is directed to the termination of a plurality of upper stations in data communication between a base station and upper stations by a transmission method wherein an existing leased line is utilized as a physical medium sublayer and ATM cells are mapped in a leased line frame format. However, also in an SDH (synchronous digital hierarchy) system utilizing, for example, 155 M, the same function can be realized when the number of interfaces connected to the base station is plural.

As described above, the invention has the following effects.

The first effect is that the VPI/VCI filter section in the base station can be constituted by an optimal number of filters even in the case where, for control signals of which the number, supported by each base station, is fixed, the number of upper stations is plural, the plurality of upper stations are connected through respective independent leased lines and all the upper stations can be logically connected to the base station, The reason for this is as follows. The leased lines connected to the base station are managed by respective numbers and are logically connected to the upper stations, and the own leased line number is added to the HEC 16 region of the ATM cell 10. By virtue of this, all the ATM cells 10 can be judged by information of the ATM cells 10 set in the filter section 32 of the protocol error detector 24.

The second effect is that the construction of the system can be simply realized. Specifically, the construction of the system according to the invention can be realized without any significant change in the basic construction of the prior art technique, that is, by simply adding the function of adding the leased line number to the HEC 16 region and providing an optimal number of filters for constituting the filter section 32 in the protocol error detector 24 unlike the prior art technique wherein the filter section is provided for each leased line.

The invention has been described in detail with particular reference to preferred embodiments, but it will be understood that variations and modifications can be effected within the scope of the invention as set forth in the appended claims.

What is claimed is:

1. A network device comprising:

an error detection unit including a filter to process data received by the network device via a communication line, the filter including:

a first detection unit to confirm a line identification number within the data, the line identification number being associated with the communication line; and a second detection unit to selectively receive the data from the first detection unit based on the confirmation; and a corrector to write the line identification number into the data when the line identification number is supported by the corrector, and transmit the data to the error detection unit.

2. The network device of claim 1, the second detection unit being further configured to compare a path identifier within the data to a set path identifier.

3. The network device of claim 1, the second detection unit being further configured to compare a channel identifier within the data to a set channel identifier.

4. The network device of claim 1, wherein the first detection unit is configured to transmit the data to the second detection unit when the line identification number corresponds to a match, and otherwise discard the data.

5. The network device of claim 1, the line identification number to be written in a header of the data.

6. The network device of claim 5, the line identification number to be written in a predetermined field of the header.

7. The network device of claim 1, the filter being further configured to process second data received by the network device via a second communication line, the first detection unit being further configured to confirm a second line identification number within the second data, the second line identification number being associated with the second communication line.

8. The network device of claim 7, further comprising:

a second corrector to write the second line identification number into the second data and transmit the second data to the error detection unit.

9. The network device of claim 1, the error detection unit including a second filter to process second data received by the network device via the communication line, the second filter including:

a third detection unit to verify the line identification number within the second data; and a fourth detection unit to selectively receive the second data from the third detection unit based on the verification.

10. A method of terminating, by a communication line interface, a set of communication lines, the communication line interface including correctors associated with each of the terminated communication lines of the set and an error detector associated with the set of the terminated communication lines, the method comprising:

demodulating, by the communication line interface, first data received via the set of terminated communication lines into second data;

adding, by the correctors, line identifiers to the second data, the line identifiers identifying the respective communication lines associated with the first data; and filtering, by the error detector, the second data received from the correctors, based on the added line identifiers.

11. The method of claim 10, the error detector including a line identifier detector and a second detector, the filtering comprising:
    forwarding to the second detector, by the line identifier detector, second data for which the line identifiers are confirmed; and
    discarding, by the line identifier detector, second data for which the line identifiers are unconfirmed.

12. The method of claim 11, the filtering further comprising:
    comparing, by the second detector, a value for a path identifier within the forwarded second data to a set of path identifier values.

13. The method of claim 12, further comprising:
    independently setting the set path identifier values for each of the terminated communication lines at respective times of logical connection, two or more of the set path identifier values being the same.

14. The method of claim 10, wherein the adding includes: adding the line identifiers to headers of the second data.

15. The method of claim 10, wherein the adding includes: adding the line identifiers to a predetermined field of headers of the second data.

16. The method of claim 10, wherein n communication lines are logically connected to the communication line interface in an n:1 relationship, wherein n<1.

17. A base station demodulator comprising:
    means for storing a path identifier value for first data communicated to the base station demodulator via two or more communication lines;
    means for writing line identification numbers in second data corresponding to the first data, the line identification number identifying the communication lines over which the first data associated with the second data is received;
    means for confirming the line identification numbers and forwarding the second data when the line identification numbers are confirmed, and discarding the second data when the line identification numbers are unconfirmed; and
    means for receiving the forwarded second data and comparing a path identifier value within the second data to the stored path identifier values.

* * * * *

UNITED STATES PATENT AND TRADEMARK OFFICE
CERTIFICATE OF CORRECTION

| | |
|---|---|
| PATENT NO. | : 7,095,721 B2 |
| APPLICATION NO. | : 09/861890 |
| DATED | : August 22, 2006 |
| INVENTOR(S) | : Hirofumi Yamagiwa |

It is certified that error appears in the above-identified patent and that said Letters Patent is hereby corrected as shown below:

Please add a space to column 10, line 13 between "confirmation;" and "and".

At column 12, line 3, the "<" sign should be a -->-- sign.

Signed and Sealed this

Tenth Day of October, 2006

JON W. DUDAS
*Director of the United States Patent and Trademark Office*